United States Patent [19]

Mowrey

[11] Patent Number: 5,268,404
[45] Date of Patent: Dec. 7, 1993

[54] ONE-COAT RUBBER-TO-METAL BONDING ADHESIVE

[75] Inventor: Douglas H. Mowrey, Pleasantville, Pa.

[73] Assignee: Lord Corporation, Erie, Pa.

[21] Appl. No.: 956,821

[22] Filed: Oct. 5, 1992

Related U.S. Application Data

[63] Continuation-in-part of Ser. No. 445,523, Dec. 4, 1989, abandoned.

[51] Int. Cl.$^5$ .............................................. C08K 5/32
[52] U.S. Cl. .................................. 524/236; 524/259; 524/432; 524/433
[58] Field of Search ................. 524/236, 259, 432, 433

[56] References Cited

U.S. PATENT DOCUMENTS

| | | | |
|---|---|---|---|
| 3,640,941 | 2/1972 | Findley et al. | 260/33.6 A |
| 4,119,587 | 10/1978 | Jazenski | 260/3.5 |
| 4,308,365 | 12/1981 | Czerwinski | 524/236 |
| 4,426,468 | 1/1984 | Ornum et al. | 524/420 |
| 4,497,926 | 2/1985 | Toy | 524/433 |
| 4,988,753 | 1/1991 | Rullmann et al. | 524/555 |
| 5,028,654 | 7/1991 | Wuest et al. | 524/552 |
| 5,036,122 | 7/1991 | Auerbach et al. | 524/259 |

FOREIGN PATENT DOCUMENTS 3720218 6/1987 Fed. Rep. of Germany .

*Primary Examiner*—Melvyn I. Marquis
*Attorney, Agent, or Firm*—W. Graham Buie

[57] ABSTRACT

An adhesive composition exhibiting strong rubber-to-metal bonds with excellent environmental resistance without the necessity of first priming the metal surface has been discovered. The composition comprises a halogenated polyolefin, an aromatic nitroso compound, metal oxide such as zinc oxide or magnesium oxide, and optionally a vulcanizing agent such as sulfur or selenium, a phenolic epoxy resin, or carbon black.

11 Claims, No Drawings

ONE-COAT RUBBER-TO-METAL BONDING ADHESIVE

This is a continuation-in-part of copending application Ser. No. 07/445,523 filed on Dec. 4, 1989 and now abandoned.

BACKGROUND OF THE INVENTION

This invention relates to lead-free, one-coat adhesive compositions capable of bonding rubber to metal without the need of a primer.

As a general rule, most known adhesives shown to be effective as single-coat, i.e., primerless, rubber-to-metal bonding agents are often only useful in bonding specific elastomers to specific substrates and thus are sadly lacking in versatility. This problem of lack of versatility in these adhesives has been partially alleviated by the use of a primer coat applied to the metal substrate and a cover coat which adheres between the elastomer and the primer.

In addition to the problem of versatility most one-coat adhesive systems suffer from one or more other disadvantages including a general inability to afford optimum adhesion, particularly at elevated temperatures, poor storage stability, poor resistance to pre-bake, poor corrosion resistance and poor resistance of the adhesive bond to environmental conditions such as solvents, moisture and the like.

More recently, one-coat compositions have been developed which satisfy these requirements. However, these adhesive compositions require the use of lead compounds to achieve the desired results. For example, U.S. Pat. No. 3,640,941 describes a one-coat rubber-to-metal adhesive containing four essential ingredients: (a) a graft polymer of a polybutadiene and a substituted cyclopentadiene monomer, (b) dibasic lead phosphite, (c) resorcinol and (d) a volatile solvent. In this adhesive system between 25-150 parts by weight of dibasic lead phosphate per 100 parts of polymer is described as necessary to achieve the desired effect.

Another commercially accepted, one-coat adhesive composition is described in U.S. Pat. No. 4,119,587. This patent describes an adhesive composition comprised of the three essential constituents: (a) halogenated polyolefinic, (b) aromatic nitroso compound, and (c) lead salts.

In view of the potential adverse environmental effects posed by the presence of lead, it would be highly desirable if a one-coat rubber-to-metal bonding adhesive composition could be developed which possesses all the aforementioned characteristics without the need of lead compounds.

It is an object of the invention to provide a lead-free adhesive composition capable of bonding a variety of elastomers to various metal substrates without the need of a primer.

Another object of the invention is to provide a general purpose one-coat adhesive composition exhibiting excellent bond versatility, sweep resistance, storage stability and environmental resistance.

Yet another object of the invention is to provide a one-coat rubber-to-metal bonding adhesive which provides excellent corrosion inhibition.

A further object of the invention is to provide a lead-free adhesive system which affords several handling advantages and enables dry film thickness readings to be taken using equipment that employs beta backscattering techniques.

SUMMARY OF THE INVENTION

These and other objects of the invention are obtained by a one-coat rubber-to-metal adhesive composition consisting essentially of (i) at least one halogen-containing polyolefin;
(ii) from about 1 to about 200 parts by weight, per 100 parts by weight of said polyolefin, of at least one aromatic nitroso compound;
(iii) from about 10 to about 120 parts by weight per 100 parts by weight of said polyolefin of at least one metal oxide selected from the group consisting of zinc oxide and magnesium oxide;
(iv) from zero to about 25 parts by weight, per 100 parts by weight of said polyolefin, of at least one maleimide compound;
(v) from zero to about 40 parts by weight, per 100 parts by weight of said polyolefin, of a vulcanizing agent selected from the group consisting of sulfur and selenium;
(vi) from zero to about 80 parts by weight, per 100 parts by weight of said polyolefin of a phenolic epoxy resin; and
(vii) an inert diluent, said diluent being present in an amount to provide a lacquer composition suitable for use as an adhesive, said lacquer having a total solids content in the range from about 5 to about 80 percent.

The adhesive compositions of the invention are characterized by the unexpected ability to provide strong rubber-to-substrate bonds with good to excellent environment resistance without the necessity of first priming the substrate surface. However, they can be used with convention substrate primer compositions if one so desires. The compositions provide excellent adhesion for both unvulcanized and vulcanized elastomer compositions without requiring treatment, such as chlorination, of the rubber surface. In addition to affording one-coat adhesive systems characterized by excellent primary adhesion and environmental resistance, the compositions of the invention exhibit excellent shelf-life stability, resistance to sweep, pre-bake resistance, good layover characteristics, and are effective over a broad spectrum of bonding temperatures, e.g., from about 90° C. to over 180° C.

The halogen-containing polyolefin component of the adhesive compositions can be natural or synthetic elastomers. The halogens employed in the halogenated polyolefinic elastomers will usually be chlorine or bromine, although fluorine can also be used. Mixed halogen can also be employed in which case the halogen-containing polyolefinic elastomer will have more than one halogen substituted thereon. The amount of halogen does not appear critical and can range from as low as about 3 weight percent to more than 70 weight percent, depending on the nature of the base polymer. Halogen-containing polyolefinic elastomers and their preparation are well-known in the art and no need is seen to elucidate in any detail on these materials or their manufacture. Representative halogen-containing polyolefinic elastomers include, without being limited thereto, chlorinated natural rubber, chlorine- and bromine-containing synthetic rubbers including polychloroprene, chlorinated polychloroprene, chlorinated polybutadiene, chlorinated butadiene styrene copolymers, chlorinated ethylene propylene copolymers and ethylene/- propylene/non-conjugated diene terpolymers, chlorinated polyethylene, chlorosulfonated polyethylene, brominated poly(1,3-dichloro-1,3-butadiene), copolymers of alphachloroacrylonitrile and 2,3-dichloro-1,3-butadiene, chlorinated poly(vinyl chloride), and the like, including mixtures of such halogen-containing elastomers. Thus, substantially any of the known halogen-containing derivatives of natural and synthetic elastomers can be employed in the practice of this invention, including mixtures of such elastomers. At the present time, chlorosulfonated polyethylene elastomers alone or in combination with chlorinated rubber constitute preferred halogen-containing film-forming polymers.

The aromatic nitroso compounds which are suitable for use in the practice of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 6 nitroso groups attached directly to non-adjacent nuclear carbon atoms. The present preferred poly-C-nitroso materials are the di-nitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the poly-C-nitroso compounds in the present invention. As far as is presently known, there is no limitation as to the character of the substituent, and such substituents can be organic or inorganic in nature. Thus, where reference is made herein to poly-C-nitroso or di-C-nitroso "aromatic compound", "benzenes", or "naphthalenes", it will be understood to include both substituted and unsubstituted nitroso compounds, unless otherwise specified.

Particularly preferred poly-C-nitroso compounds are characterized by the formula:

(R)$_m$—Ar—(NO)$_2$ wherein

Ar is selected from the group consisting of phenylene and naphthalene:

R is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is zero, 1, 2, 3, or 4 and preferably is zero.

A partial non-limiting listing of suitable poly-C-nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrobenzene, and 2-cyclohexyl-1,4-dinitrosobenzene. Amount of aromatic dinitrono compound used in the adhesive may be from 1 to 200 parts by weight per 100 parts of polyolefin and preferably from 50 to 150 parts.

The metal oxides which are suitable for use in the present invention are zinc oxide and magnesium oxide. The metal oxides are well-known articles of commerce and need not be discussed here in detail. It is noted that other oxides including lead oxide, iron oxide and calcium oxide were tried in one-coat rubber-to-metal adhesives but failed to provide the required environment resistance.

The effectiveness of the herein-described metal oxides, particularly with respect to providing environmental resistance for rubber-to-metal adhesive compositions is not fully understood. It is known that such metal oxides as an amphoteric material, react with acids to form zinc salts, thereby acting as an acid scavenger. Furthermore, such metal oxides are well known curing activators in the vulcanization of rubber.

Past disclosures have stated the metal oxides would not provide the same environmental resistance for rubber-to-metal adhesive compositions as would other acid scavengers such as lead salts. However, it has been found that not only do such metal oxides provide the desired environmental resistance, they also provide lead-free, one-coat rubber-to-metal adhesive compositions with comparable environmental resistance. Amount of metal oxide used in the adhesive composition may be from about 10 to about 120 parts by weight per 100 parts of polyolefin and preferably from 12 to about 80 parts.

Maleimide compounds which are suitable for use in the present invention include all of the maleimide, bismaleimide and related compounds which are described in U.S. Pat. Nos. 2,444,536 and 2,462,835, which disclosures are herein incorporated by reference. Preferred maleimide compounds include the N,N'linked bismaleimides which are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkyphenol, or sulfonyl, m-phenylene-bis-maleimide is a presently preferred compound, and is available as "HVA-2" from E. I. du Pont de Nemours and Co., (Inc.). Amount of maleimide compound used in the adhesive may be from 0 to 50 parts by weight per 100 parts of polyolefin and preferably from 10 to 40 parts.

Instead of a maleimide compound as defined above, the present invention may utilize a polymaleimide compound. The polymaleimide compound of the invention may be an aliphatic or aromatic polymaleimide and must contain at least two maleimide groups. Aromatic polymaleimides having from about 1 to 100 aromatic nuclei wherein the maleimide groups are directly attached to each adjacent aromatic ring are preferred. Particularly preferred polymaleimide compounds have the formula:

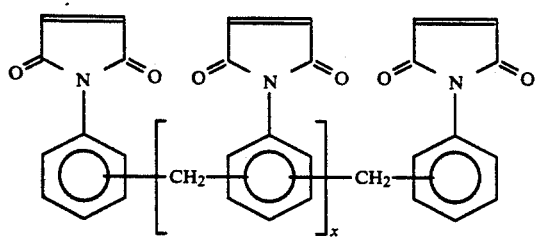

wherein x is from about 1 to 100. Such polymaleimides are common materials of commerce and are sold under different trade names by different companies, such as BMI-M-20 polymaleimide supplied by Mitsui Toatsu Fine Chemicals, Incorporated. The amount of polymaleimide compound used in the adhesive may be from about 5 to 100 parts by weight per 100 parts of polyolefin and preferably from about 10 to 60 parts.

The vulcanizing agents which are suitable for use in the present invention are sulfur and selenium. The vulcanizing agents are well-known articles of commerce and need not be discussed in here in detail. Amount of vulcanizing agent used in the adhesive composition may be from 0 to about 40 parts by weight per 100 parts of polyolefin and preferably from 5 to 30 parts.

The metal oxide component and the vulcanizing agent component of the adhesive composition are added in finely divided form or as a dispersion in a suitable liquid carrier.

By "phenolic epoxy resins" as employed in this invention is meant the polyglycidyl polyethers of polyhydric phenols. These phenolic-epoxy resins are complex polymeric reaction products of polyhydric phenols with polyfunctional holohydrins and/or glycerol dichlorohydrin. The products thus obtained contain terminal epoxy groups. A large number of epoxy resins of this type are disclosed in Greenlee U.S. Pat. Nos. 2,585,115 and 2,589,245. Several of these resins are readily available commerical products.

Typical polyhydric phenols useful in the preparation of the phenolic epoxy resins of the present invention include resorcinal and novolac resins resulting from condensation of phenol with formaldehyde. The phenol/formaldehyde molar ratio, coupled with the type of catalyst, determines whether the resulting polymer is phenol terminated or methylol terminated; phenol-terminated are referred to as novolacs. These are produced from a reaction mixture having a formaldehyde/phenol molar ratio between 0.5 and 0.8 in the presence of an acid catalyst. Resorcinal is a very reactive dihydric phenol with formaldehyde, allowing for the preparation of resorcinal-formaldehyde novolacs.

A typical phenolic epoxy resin prepared from the novolac resins and epichlorohydrin has the following structural formula:

In which R is hydrogen or an alkyl group having from one to four carbon atoms and n has a range of 1 to 8.

Phenolic epoxy resins may be further characterized by reference of their epoxy weight of pure epoxy resins being the mean molecular weight of the resin divided by the mean number of epoxy radicals per molecule or in any case the number of grams of epoxy resin equivalent to one mole of the epoxy group or one gram equivalent of epoxide. The phenolic epoxy resins that may be used in the present invention have an epoxy equivalent weight of about 400–1000. Amount of phenolic epoxy resins used in the adhesive may be from 0 to about 80 parts by weight per 100 parts by weight of said polyolefin, and preferably from about 2 to about 50 parts.

If desired, the adhesive compositions of the invention can include conventional additives such as inert filer material, polymeric film-forming adjuncts, pigments, solvent and the like, with the amounts of such additions being within the range customarily employed. A particularly preferred filler is carbon black and when utilized is incorporated in amounts ranging from 0 to 20% by weight.

The adhesive compositions of this invention are prepared by conventional means. For ease of application, as is conventional in this art, the components will be mixed and dispersed in an inert liquid carrier which, once the composition has been applied, can be readily evaporated. Examples of suitable carriers are aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloroide and the like; ketones such as methyl ethyl ketone, methyl isobutyl ketone, and the like; ethers, naphthas, etc., including mixtures of such carriers. The amount of the carrier employed is that which provides a composition suitable for use as an adhesive. This amount will ordinarily be such as to provide a total solids content ranging from about 5 to 80, preferably about 15 to about 40 percent by weight.

The adhesive compositions of the present invention have been found to be particularly suitable for bonding a wide variety of elastomeric materials, including both vulcanized and vulcanizable elastomeric materials, to themselves or to other substrates, particularly to metal substrates. Elastomers which can be bonded include without limitation natural rubber, polychloroprene rubber, styrenebutadiene rubber, nitrile rubber, ethylene/propylene copolymer rubber (EPM); ethylene/propylene/diene terpolymer rubber (EPDM); butyl rubber, polyurethane rubber, parel type elastomers, and the like. Other substrates which can be effectively bonded to themselves or to elastomers include fabrics such as fiberglass, polyamides, polyester, aramides, e.g., Kevlar, a trademark of E. I. du Pont de Nemours Co., (Inc.), of Wilmington, Del., glass, ceramics and the like.

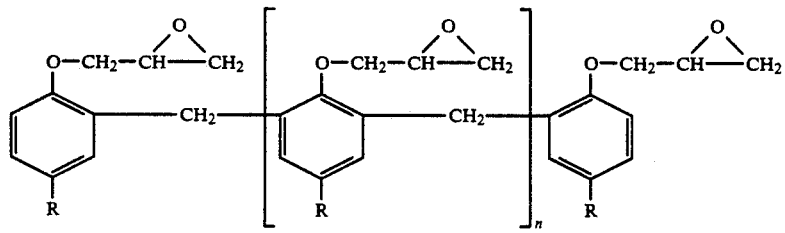

Metals and their alloys to which the elastomers can be bonded include steel, stainless steel, lead, aluminum, copper, brass, bronze, Monel metals, nickel, zinc, and the like, including treated metals such as phosphatized steel, galvanized steel, and the like.

The adhesive compositions are applied to substrate surfaces in a conventional manner such as by dipping, spraying, brushing, and the like. Preferably, the substrate surfaces are allowed to dry after coating before being brought together. After the surfaces have been pressed together with the adhesive layer in between, the assembly is heated in accordance with conventional practices. The exact conditions selected will depend upon the particular elastomer being bonded and whether or not it is cured. If the rubber is uncured, the curing is to be effected during bonding, the conditions will be dictated by the rubber composition and will generally be at a temperature of from about 140° C. to about 200° C. for from about 5 to about 60 minutes. If the rubber is already cured, the bonding temperature may range from about 90° C. to above 180° C. for from 15 to about 120 minutes. Alternatively, in situations where applicable, the adhesives can be interspersed between the surfaces to be joined as a solid film or tape (100% TSC adhesive system) with bonding being accomplished as before.

The following examples are provided for purposes of illustrating the invention, it being understood that the invention is not limited to the examples nor to the specific details therein enumerated. In the examples, amounts are parts by weight, unless otherwise specified.

In the examples, the substrate to which the elastomeric material was bonded was not primed. The composite assembly was cured at conventional conditions of time and temperature for the specific elastomer. The bonded assemblies are tested for environmental resistance according to the boiling water test. In this test, bonded assemblies, after having been scored at the bond line and prestressed by bending the rubber body back from the substrate, are immersed in boiling water for two hours. The assemblies so treated are tested for relative bond strength by pulling the rubber body from the substrate. In the data reported in the examples, failure is expressed in terms of percent of failure in the rubber body, e.g., 95 R means that 95 percent of the failure occurred in the rubber body, with the remaining failure being between the adhesive composition and the metal, or the like.

EXAMPLE 1

Adhesive compositions A–T as follows in Table I were prepared by mixing the following ingredients on a Kady mill:

TABLE I

| Composition, PBW | A | B | C | D | E | F |
|---|---|---|---|---|---|---|
| Chlorosulfonated polyethene | 15 | 15 | 15 | 24 | 24 | 24 |
| Chlorinated natural rubber | 6 | 8 | 8 | 9 | 9 | 9 |
| p Dinitrosobenzene | 18 | 20 | 20 | 29 | 29 | 29 |
| Zinc oxide | 12 | — | 12 | 8.5 | 17 | 25 |
| Magnesium oxide | — | — | — | — | — | — |
| N,N'-phenylene-bismaleimide | 4 | — | — | 8 | 8 | 8 |
| Carbon black | 5 | 7 | 7 | 6 | 6 | 6 |
| Dibasic lead phosphite | — | 12 | — | — | — | — |
| Epoxy novok | — | — | — | 2 | 2 | 2 |
| Selenium | — | — | — | 5 | 5 | 5 |
| Silica | 2 | — | — | — | — | — |
| Toluene | @ 25% TSC (A–C) | | | @ 27% TSC (D–T) | | |

TABLE I-continued

| Composition, PBW | G | H | I | J | K | L | M |
|---|---|---|---|---|---|---|---|
| Chlorosulfonated polyethene | 24 | 24 | 24 | 24 | 24 | 24 | 24 |
| Chlorinated natural rubber | 9 | 9 | 9 | 9 | 9 | 9 | 9 |
| p Dinitrosobenzene | 23 | 24 | 25 | 26 | 29 | 29 | 29 |
| Zinc oxide | — | — | — | — | 17 | 17 | 17 |
| Magnesium oxide | 5.0 | 7.5 | 10.0 | 12.5 | — | — | — |
| N,N'-phenylene-bismaleimide | 8 | 8 | 8 | 8 | — | 4 | 8 |
| Carbon black | 6 | 6 | 6 | 6 | 6 | 6 | 6 |
| Dibasic lead phosphite | — | — | — | — | — | — | — |
| Epoxy novok | 2 | 2 | 2 | 2 | 2 | 2 | 2 |
| Selenium | — | — | — | — | 5 | 5 | 5 |
| Silica | — | — | — | — | — | — | — |
| Toluene | | | | | | | |

| Composition, PBW | N | O | P | Q | R | S | T |
|---|---|---|---|---|---|---|---|
| Chlorosulfonated polyethene | 24 | 24 | 24 | 24 | 24 | 24 | 24 |
| Chlorinated natural rubber | 9 | 9 | 9 | 9 | 9 | 9 | 9 |
| p Dinitrosobenzene | 29 | 29 | 29 | 29 | 29 | 29 | 29 |
| Zinc oxide | 17 | 17 | 17 | 17 | 17 | 17 | 17 |
| Magnesium oxide | — | — | — | — | — | — | — |
| N,N'-phenylene-bismaleimide | 12 | 8 | 8 | 8 | 8 | 8 | 8 |
| Carbon black | 6 | 6 | 6 | 6 | 6 | 6 | 6 |
| Dibasic lead phosphite | — | — | — | — | — | — | — |
| Epoxy novok | 2 | 2 | 2 | 2 | 1 | 2 | 3 |
| Selenium | 5 | 2.5 | 5 | 7.5 | 5 | 5 | 5 |
| Silica | — | — | — | — | — | — | — |
| Toluene | | | | | | | |

It is noted that Example A was a repeat of Example IV-1 shown in the Jazenski et al U.S. Pat. No. 4,119,587 and Example B shows the positive effect of removing silica from the composition.

The adhesive compositions are employed to bond unvulcanized natural rubber stock to grit-blasted, degreased cold-rolled steel. The assemblies thus prepared were cured at 125° C. for 15 minutes with no prebake. Boiling water tests according to ASTM were made with the following results:

TABLE II

| Boiling Water, 2 hours Adhesive - Rubber Retention % No Prebake | |
|---|---|
| A | 79 R |
| B | 80 R |
| C | 66 R |
| D | 72 R |
| E | 88 R |
| F | 72 R |
| G | 70 R |
| H | 80 R |
| I | 75 R |
| J | 80 R |
| K | 70 R |
| L | 78 R |
| M | 88 R |
| N | 66 R |
| O | 78 R |
| P | 88 R |
| Q | 77 R |
| R | 85 R |
| S | 88 R |
| T | 60 R |

EXAMPLE 2

An adhesive composition is prepared utilizing 75 parts by weight of chlorinated ethylene/propylene/-non-conjugated diene terpolymer, 25 parts by weight of chlorosulfonated polyethylene, 75 parts by weight of p-dinitrosobenzene, 12.5 parts by weight of polymaleimide (BMI-M-20), 12.5 parts by weight of zinc oxide, 18.7 parts by weight of epoxy novolak resin, and 43.6 parts by weight of carbon black in a toluene solvent at a total solids content of 25 percent. The adhesive composition is then bonded and tested in accordance with the procedure of Example 1. The adhesive composition caused a 60 percent failure in the rubber body.

What is claimed is:

1. An adhesive composition comprising a halogen-containing polyolefin, an aromatic nitroso compound, a polymaleimide compound, and a metal oxide selected from the group consisting of zinc oxide and magnesium oxide.

2. An adhesive composition according to claim 1, wherein the halogen-containing polyolefin is selected from the group consisting of chlorinated natural rubber, chlorosulfonated polyethylene, chlorinated ethylene/-propylene/non-conjugated diene terpolymers and mixtures thereof.

3. An adhesive composition according to claim 1 wherein the aromatic nitroso compound is dinitrosobenzene.

4. An adhesive composition according to claim 1 wherein the polymaleimide compound has the formula

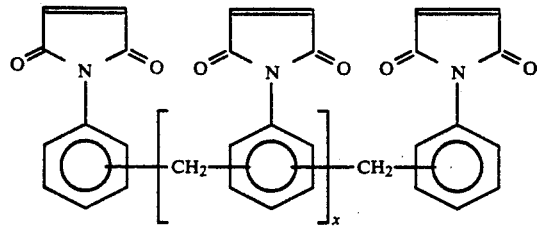

wherein x is from about 1 to 100.

5. An adhesive composition according to claim 1 wherein the aromatic nitroso compound is present in an amount from about 1 to 200 parts by weight, the polymaleimide compound is present in an amount from about 5 to 100 parts by weight and the metal oxide is present in an amount from about 10 to 120 parts by weight, all parts by weight being per 100 parts by weight of halogen-containing polyolefin.

6. An adhesive composition according to claim 5 wherein the aromatic nitroso compound is present in an amount from about 50 to 150 parts by weight, the polymaleimide compound is present in an amount from about 10 to 60 parts by weight and the metal oxide is present in an amount from about 12 to 80 parts by weight.

7. An adhesive composition according to claim 1 further comprising a vulcanizing agent selected from the group consisting of sulfur and selenium.

8. An adhesive composition according to claim 7 wherein the vulcanizing agent is present in an amount from about 5 to 30 parts by weight per 100 parts by weight of halogen-containing polyolefin.

9. An adhesive composition according to claim 1 further comprising a phenolic epoxy resin.

10. An adhesive composition according to claim 9 wherein the phenolic epoxy resin is a novolak epoxy resin.

11. An adhesive composition according to claim 9 wherein the phenolic epoxy resin is present in an amount from about 2 to 50 parts by weight per 100 parts by weight of halogen-containing polyolefin.

* * * * *